G. G. Curtiss.
Sliding Gate.

Nº 62,735. Patented Mar. 12, 1867.

Witnesses;
Chas. L. Spencer
J. A. Davis

Inventor;
Geo. G. Curtiss,
By J. Fraser & Co,
Attys.

United States Patent Office.

GEORGE G. CURTISS, OF ROCHESTER, NEW YORK.

Letters Patent No. 62,735, dated March 12, 1867.

IMPROVEMENT IN GATES.

The Schedule referred to in these Letters Patent and making part of the same.

TO ALL WHOM IT MAY CONCERN:

Be it known that I, GEORGE G. CURTISS, of Rochester, in the county of Monroe, and State of New York, have invented certain new and useful Improvements in Gates; and I do hereby declare that the following is a full and exact description thereof, reference being had to the accompanying drawings, making part of this specification.

Figure 1:
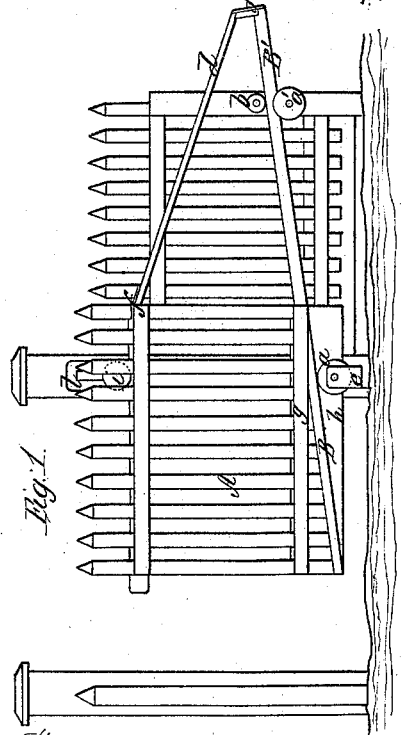

Figure 1 is an elevation of a yard gate provided with my improvements.

Figure 2:
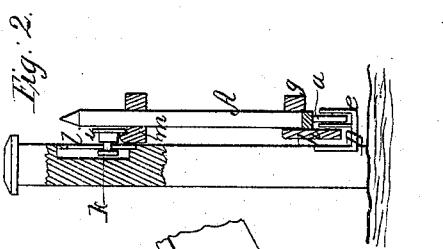

Figure 2, a vertical cross-section of the same.

Figure 3:
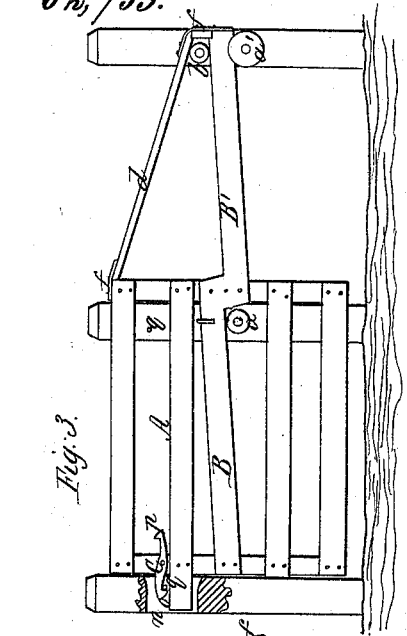
Figure 4:
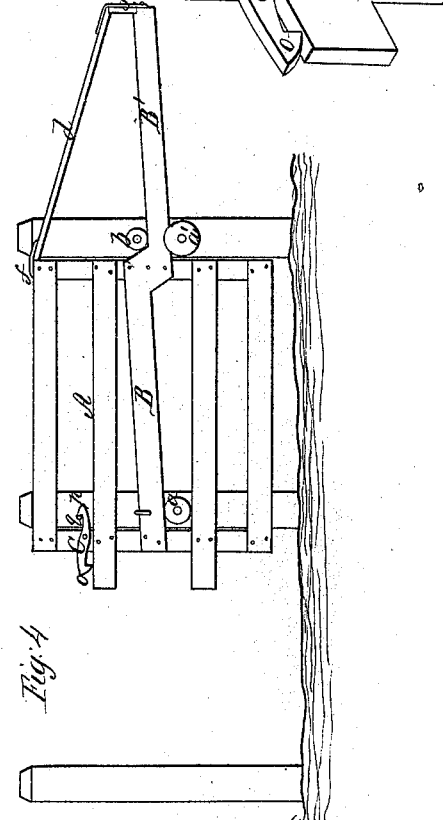

Figures 3 and 4, elevations of a farm gate in the closed and open positions, with my improvements applied thereto.

Figure 5:
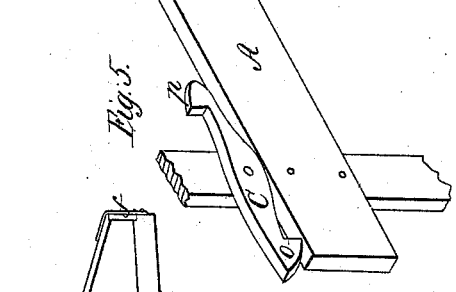

Figure 5, a perspective view of the double-acting latch arrangement for holding the gate open and shut.

Like letters of reference indicate corresponding parts in all the figures.

My improvement belongs to that class in which the gate simply slides backward and forward on rollers. The invention consists more especially in the employment of double extended inclined rails, suitably braced, which insure an automatic action in closing; and furthermore, in the special arrangement of the friction-rollers and guide, and the double-acting latch, for holding the gate either open or closed.

As represented in the drawings, A is a gate, constructed with pickets for yard use, and rails for farm use, as usual. This gate is provided with double inclined rails, B B', one extending the length of the gate proper, and the other an equal distance beyond, so as to allow the necessary range of motion. From the extreme outer end of the extended rail, B', a brace, $d$, passes upward to the gate, the connection being preferably made by iron straps, $ff$, as shown. The inclines B B' rest upon two rollers, $a\ a'$, at suitable distance apart to properly balance. The roller $a'$ has a flange outside the rail to prevent lateral motion, and the rail is kept upon it by another roller, $b$, situated above. A single inclined rail, extending the length of the gate, has before been employed, running upon rollers, and an extended rail has also been employed, but situated horizontally, and not inclined as in my device. In the former, the object has simply been to make the gate self-acting in closing by its own weight, while in the latter the object has been to steady the gate, hold it firmly in place, and guide it in action, and that without extending the length of the gate proper itself back beyond what is necessary to close the passage. By the employment of the double inclines B B', I combine in a single device all the advantages of the two above mentioned. While I elevate the gate in opening so as to rise above obstructions, and make it self-acting in closing, I at the same time avoid extending the length of the gate proper back further than the length of the space it closes; but such a length of inclines is attained that the gate has the requisite range of motion, and in this action it is held perfectly steady and firm against the weight of the gate itself. I am not aware that this effect has ever before been attained. The employment of the brace $d$ holds the extension B' always firm and stiff with the gate. It will be noticed that the parts B' and $d$ stand on a similar but an opposite incline, so that the rail is not only braced against downward but also against upward strain. The angle is such as to accomplish the best effect. The gate is thus made stiff and rigid from end to end. Were it not for the brace, the rail, from its slender size and considerable length, might warp, bend, and break, from the great leverage of the gate. For yard gates I prefer to arrange the roller $a$ as shown in figs. 1 and 2. It is situated under the usual rail, $g$, to which the pickets are nailed, and within the base-board $h$ on the opposite side, so that it is perfectly shielded from the weather. In order to retain it in this peculiar situation I enclose it in bearings, $e\ e$, of a clip or stirrup, D, which passes down under the base-board and attaches to the post. The inner bearing $e$ in this case serves as the guide to hold the gate from lateral action. The guide $i$, that holds the top of the gate, I make in the form of a wheel or slide, which has a flange outside striking into a groove in a rail, $m$, and a flange or shoulder on the inside which rests in the slot of a plate, $l$, secured to the side of the post. This slot is of sufficient length to allow the necessary vertical action of the wheel or slide as the gate moves back and forth. This wheel or slide adapts itself to the gate at all positions, and always retains it in place. Owing to the fact that pickets are used, which obstruct the rails, the ordinary hook-guide cannot be conveniently employed. At the upper front end of the gate is pivoted a latch, C, having catches, $o\ p$, situated in opposite directions, and engaging respectively with pins, $q\ q$, connected with the opposite posts. In opening, the catch $p$ will strike the pin, and, catching over it, will hold the gate open; and in closing, the catch $o$ will strike the opposite pin, in the mortise n, and hold the gate closed. This forms a very convenient and effective device to be used with the self-acting gate, as it holds it in both positions, and but one latch is required.

I do not claim broadly and separately either an incline, to make a gate self-acting, or an extended rail, to retain it in position, as I am aware that the same have before been known; but

What I claim as my invention, and desire to secure by Letters Patent, is—

1. In combination with a sliding gate, A, the employment of the double-inclined rails B B', the one running the length of the gate, and the other extending beyond and serving to hold the gate in place, while at the same time it insures its self-action, the whole arranged and operating as and for the purposes herein set forth.

2. The combination of the brace d, with the extended inclined rail B' and gate A, as and for the purpose specified.

3. The combination and arrangement of the clip or stirrup D, holding the roller a, operating as herein set forth.

4. The combination of the sliding guide i with gate A and inclines B B', as set forth.

5. The double-acting latch C, employed in combination with the gate A, as specified.

In witness whereof I have hereunto signed my name in the presence of two subscribing witnesses.

GEO. G. CURTISS.

Witnesses:
R. F. OSGOOD,
J. A. DAVIS.